E. E. BULLARD.
RESILIENT TIRE.
APPLICATION FILED APR. 19, 1918.

1,295,266. Patented Feb. 25, 1919.
2 SHEETS—SHEET 1.

Inventor
Edwin E. Bullard,
By Geo. A. Hutchinson
Attorney

UNITED STATES PATENT OFFICE.

EDWIN E. BULLARD, OF SPRINGFIELD, ILLINOIS.

RESILIENT TIRE.

1,295,266.  Specification of Letters Patent.  Patented Feb. 25, 1919.

Application filed April 19, 1918. Serial No. 229,563.

*To all whom it may concern:*

Be it known that I, EDWIN E. BULLARD, a citizen of the United States, residing at Springfield, in the county of Sangamon and State of Illinois, have invented certain new and useful Improvements in Resilient Tires, of which the following is a full, clear, and exact specification.

This invention relates to resilient tires for automobiles and other vehicles, and has for one of its objects to provide a tire of this kind that will not be affected by puncture or tears.

Another object is to provide a tire that will require less rubber for its manufacture than is used at present. It is also the aim of the invention to simplify the construction of the tire, to adapt it to be used on the ordinary clencher rim now on the market, to employ resilient reinforcing elements which will not cut through the tread of the tire, and to retain the tire against slipping around on the rim.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

The body 1 of the tire is made substantially like the outer casing of a pneumatic tire except that resilient reinforcing elements are embedded in said body to provide a yielding springy support thereto in lieu of the usual inner pneumatic tube which is discarded. Outwardly extending ribs or beads 2 are formed on the edges of the tire to fit below the turned-in flanges 3 and 13 of the ordinary clencher rim 4, and the resilient reinforcing elements embedded in the tire serve to spread apart the edges of the same so as to maintain said ribs or beads in engagement with said flanges.

Figure 1:
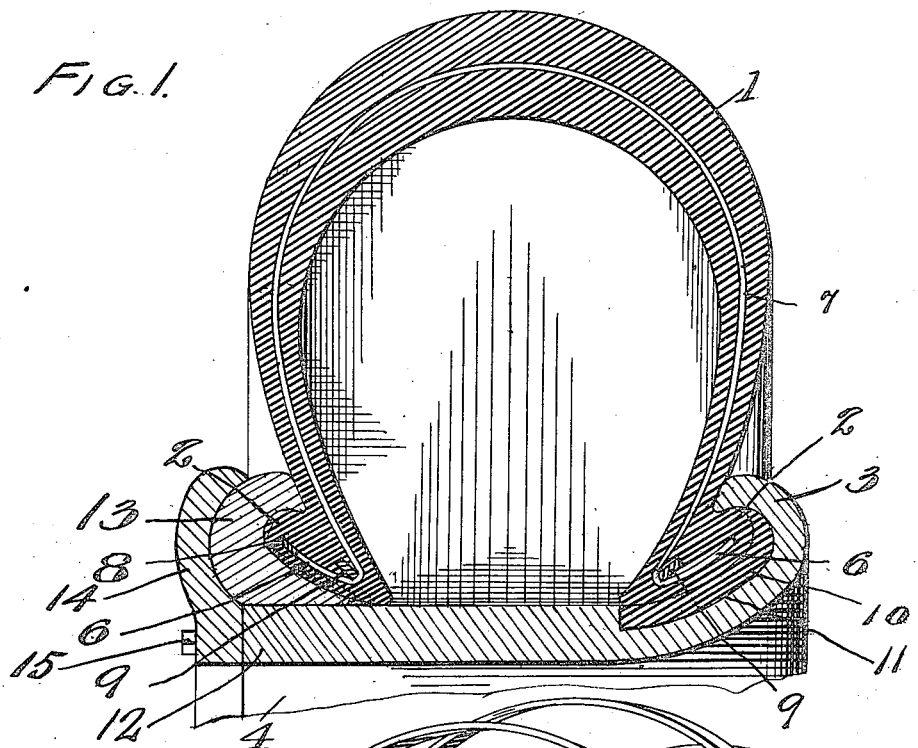
Figure 1 is a section transversely through a tire constructed substantially in accordance with this invention and mounted on an ordinary clencher rim which is also shown in section, the section being taken through one of the interlocking lugs and recesses for preventing the tire from slipping around on the rim.
Figure 2:
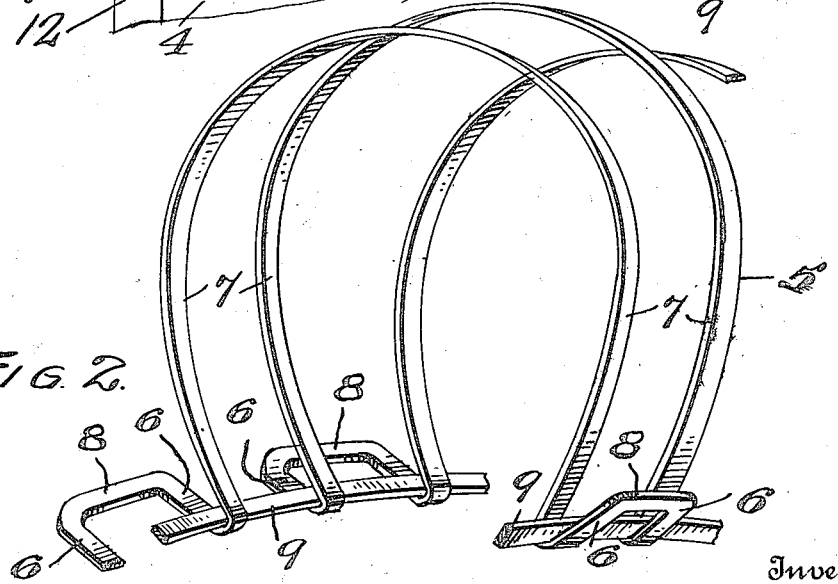
Fig. 2 is a detailed perspective view of the reinforcing means which is embedded in the body of the tire.
Figure 3:
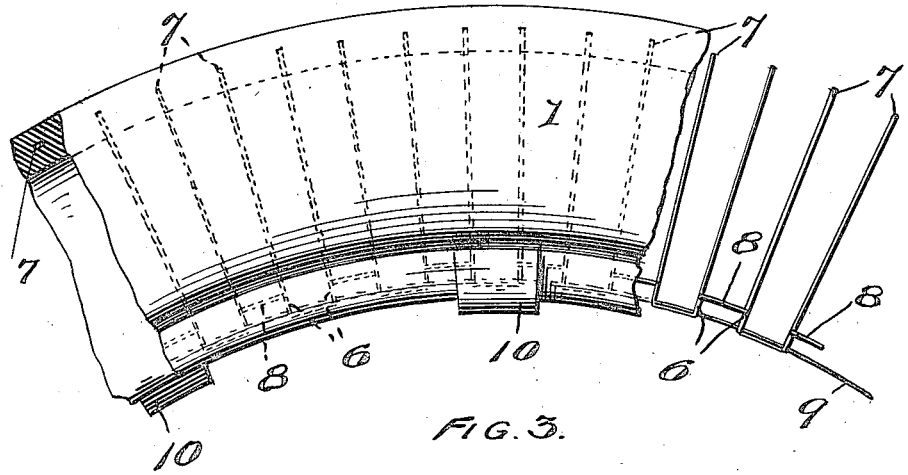
Fig. 3 is a broken side elevation of a portion of the tire.
Figure 4:
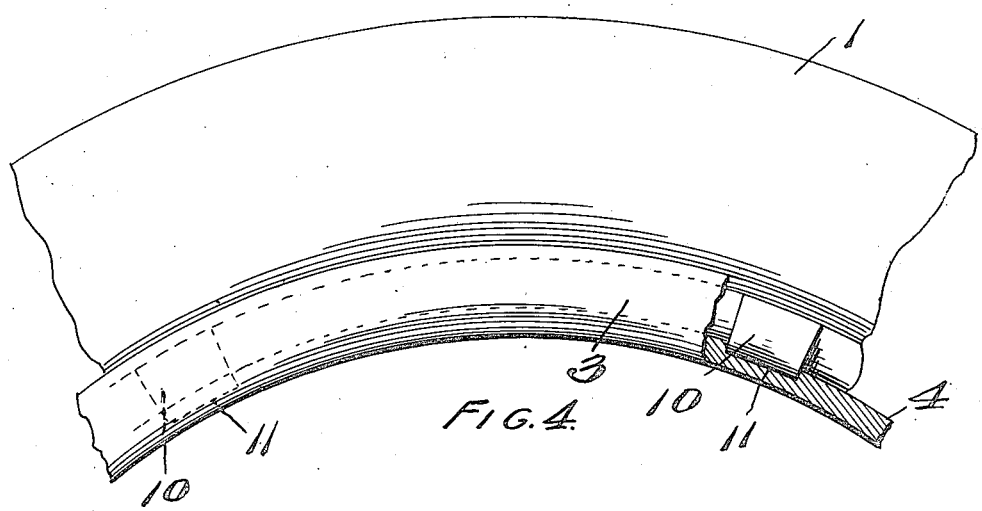
Fig. 4 is a fragmentary side elevation of the tire on the rim, a portion of the latter being broken away to show one of the recesses in the same to receive a lug on the tire.

The reinforcing element consists of one or more strips 5 of resilient metal of suitable shape, size and temper to afford the desired support to the tire, said strips having outwardly turned portions 6 to reinforce the ribs or beads 2, and continuous rings 9 arranged in the angles between said outwardly turned portions and the main loops 7 of the strips for binding all of said loops and outwardly turned portions together to conform to the shape of the tire. A plurality of the loops 7 and projections 6 of the resilient reinforcing member are preferably made of a single strip 5 which is bent laterally at the ends of the outwardly turned portions 6 to connect with the next ones, as at 8, best shown in Fig. 2. Of course, a single strip 5 or any number of such strips may be employed in making the reinforcement for the entire tire. The strip may be any shape in cross section, but it is preferable to make it flat substantially as illustrated to avoid having said strip cut through the body of the tire.

At suitable intervals on either or both edges of the tire integral lugs 10 are formed to fit correspondingly placed recesses 11 in the rim for preventing the tire from slipping or creeping on the rim. As illustrated, these lugs 10 are arranged in staggered relation on opposite sides or edges of the tire, but it may suffice to place said lugs on only one side or edge of the tire. It will be understood, however, that the lugs may be omitted from the tire or other means employed for preventing the tire from slipping or creeping on the rim without departing from the invention in so far as it relates to the reinforced U-shaped tire with the ribs or beads at its edges for engaging the flanges on the clencher rim. The clencher rim 4 may be of any well-known construction, that illustrated by way of example having one of its flanges, 13, detachably mounted on one flat edge 12 of said rim and retained in place by a ring 14 fastened to said edge 12 of the rim by bolts 15. When the ring 14 and detachable flange 13 are removed, the tire may be slipped on or off, the lugs 10 being capable of yielding slightly so as to ride over the rim and drop into the recesses 11 therein.

Having thus described my invention, what I claim as new and desire to secure by Letters Patent of the United States is:—

1. The combination with a tire having beads formed along its edges to engage the flanges of a clencher rim, of resilient reinforcing means embedded in said tire, outwardly turned extensions of said reinforcing means arranged in the beads, and rings arranged in the angles between said reinforcing means which is embedded in the body of the tire and the extensions which are arranged in the beads.

2. The combination with a tire having beads formed along its edges to engage the flanges of a clencher rim, of resilient reinforcing means comprising metal strips formed into loops embedded in the body of the tire and having outwardly bent portions at the ends of said loops extending into said beads, and rings also embedded in the tire and arranged in the angles between said loops and outwardly bent portions for the purpose specified.

3. The combination with a tire having beads formed along its edges to engage the flanges of a clencher rim, of resilient reinforcing means comprising metal strips formed into loops embedded in the body of the tire and having outwardly bent portions at the ends of said loops extending into said beads, and connections between said outwardly bent portions of adjacent loops.

4. The combination with a tire having beads formed along its edges to engage the flanges of a clencher rim, of resilient reinforcing means comprising metal strips formed into loops embedded in the body of the tire and having outwardly bent portions at the ends of said loops extending into said beads, and connections between the outwardly bent portion at one end of each loop and the corresponding portion of the next loop at one side thereof, and between the outwardly bent portion at the other end of said loop and the corresponding portion of the next loop at the other side thereof.

In testimony whereof I have signed my name to this specification.

EDWIN E. BULLARD.